April 20, 1954     H. BROWN     2,675,978
PIPE SPACER
Filed Aug. 7, 1950

INVENTOR
HARRY BROWN
BY
ATTORNEYS

Patented Apr. 20, 1954

2,675,978

UNITED STATES PATENT OFFICE 2,675,978

PIPE SPACER

Harry Brown, Los Angeles, Calif.

Application August 7, 1950, Serial No. 178,072

4 Claims. (Cl. 248—65)

This invention has to do with pipe spacers and relates more particularly to a spacer for retaining a pipe in position spaced between contiguous rafters or other structural members in building construction.

It is an object of the invention to provide a pipe spacer which may be sold, shipped and stored in flattened and stacked condition and which may be easily formed into circular position around the pipe when placed in use.

It is also an object of the invention to provide a pipe spacer which is adjustable lengthwise or circumferentially so as to be fitted onto pipes of varying diameters.

A further object is to provide a pipe spacer which may be installed on the pipe after the pipe is installed in the structure.

Another object is to provide a pipe spacer which securely centers the pipe between two adjacent structural members and which provides ample air space around the pipe.

Additional objects will appear as the following detailed description of a presently preferred embodiment of the invention proceeds, for which purpose I shall refer to the accompanying drawings, wherein.

Figure 1:
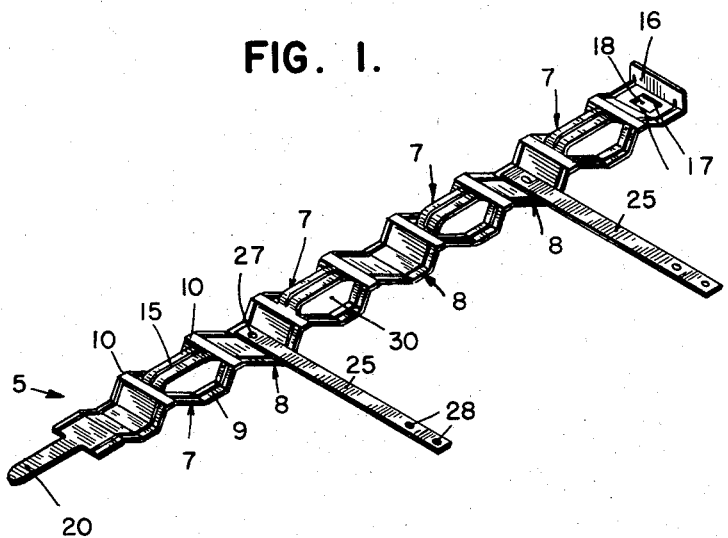
Fig. 1 is a perspective of my pipe spacer device in flattened condition.

In the drawings my spacer is generally denoted by the numeral 5 and is a stamping made from sheet metal to provide a rectangular strip having transverse corrugations 7 and 8. Each of the corrugations has, adjacent each side edge, a longitudinally embossed reinforcing bead 9 which extends from one of the flattened high points 10 to the contiguous like high point.

Each corrugation 7 has a web or strip 15 struck out of the metal forming the corrugation and bent upwardly out of the plane of the corrugation into a somewhat arched position.

One end 16 is bent into position at right angles to the plane of the contiguous portion, and the latter portion is provided with parallel transverse slits 17. The portion 18 between the slits is bent out of the plane of the flat portion so that the slits provide passageways or slots to receive an elongated tongue 20 formed integral with the opposite end of the device.

A pair of anchor straps 25 are provided and each has its inner end secured to the strip 5 within one of the corrugations 8, as by a rivet 27. The opposite end portion of each strap is provided with nail receiving holes 28 to facilitate fastening the straps to a rafter R or other suitable structural member.

The spacer devices may be stacked one on the other with the webs 15 of a lower device fitting in the holes 30 of an upper device and with the intervening corrugations 8 in superimposed relation. The straps remain straight as shown in Fig. 1 until ready for use.

Figure 2:
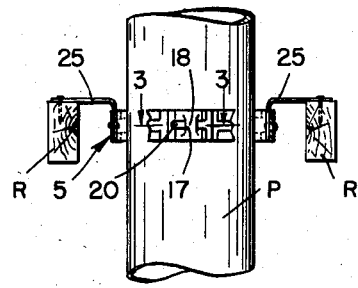
Fig. 2 is a side elevation showing the device in use for the purpose of spacing a pipe medially between two rafters.
Figure 4:
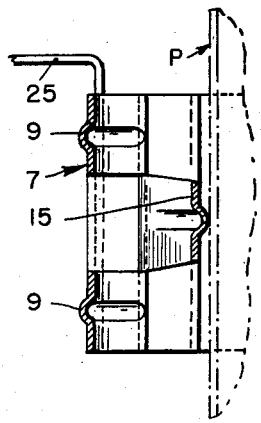
Fig. 4 is an enlarged fragmentary view.
Figure 3:
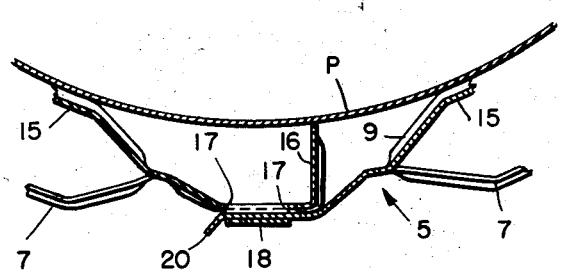
Fig. 3 is an enlarged section taken on line 3—3 of Fig. 2.

The devices are preferably made of a metal having sufficient pliability to allow them to be bent into circular form about a pipe in use, to allow the straps to be bent into the circular position shown in Fig. 2, and to allow the extreme outer end portion of the tongue 20 to be bent outwardly after being passed through the slits 17. The tongue is of sufficient length to enable considerable lengthwise adjustment of the device to fit pipes P of varying diameters.

The corrugations provide ample air circulation space above the pipe.

I claim:

1. A device comprising a pliant, transversely corrugated strip having a tongue-like extension at one end and a tongue-receiving slot at its other end, alternate corrugations of said strip having longitudinal, medial strips struck therefrom and bent out of the plane of the corrugations into arched position, said strip being adapted to be bent into circular shape around a pipe and retained in such shape.

2. A device for spacing a pipe between two structural members comprising a pliant transversely corrugated strip having a tongue-like extension at one end and a tongue-receiving slot at its other end, and a pair of strap members secured at one end to the strip at points spaced apart longitudinally thereof and extending laterally therefrom for attachment at their outer ends to said respective structural members, said strip being adapted to be bent into circular shape around a pipe and retained in such shape, and said corrugations having longitudinal embossed reinforcing beads adjacent and parallel to their side edges.

3. A device for spacing a pipe between two structural members comprising a pliant transversely corrugated strip having a tongue-like extension at one end and a tongue-receiving slot at its other end, and a pair of strap members secured at one end to the strip at points spaced apart longitudinally thereof and extending laterally therefrom for attachment at their outer ends to said respective structural members, said strip being adapted to be bent into circular shape around a pipe and retained in such shape, and said corrugations having longitudinal embossed reinforcing beads adjacent and parallel to their side edges and transverse flat portions between contiguous corrugations.

4. A device for spacing a pipe between two structural members comprising a pliant transversely corrugated strip having a tongue-like extension at one end and a tongue-receiving slot at its other end, and a pair of strap members secured at one end to the strip at points spaced apart longitudinally thereof and extending laterally therefrom for attachment at their outer ends to said respective structural members, said strip being adapted to be bent into circular shape around a pipe and retained in such shape, and alternate ones of said corrugations having longitudinal medial strips struck therefrom and bent out of the plane of the corrugations into arched position.

References Cited in the file of this patent

UNITED STATES PATENTS

| Number | Name | Date |
| --- | --- | --- |
| 362,376 | Gould et al. | May 3, 1887 |
| 833,613 | Maiser | Oct. 16, 1906 |
| 1,095,323 | Fowler | May 5, 1914 |
| 1,571,000 | Eustis | Jan. 26, 1926 |
| 1,619,841 | Witwer | Mar. 8, 1927 |
| 2,215,283 | Adler | Sept. 17, 1940 |
| 2,339,992 | Hohmeister | Jan. 25, 1944 |

FOREIGN PATENTS

| Number | Country | Date |
| --- | --- | --- |
| 51,706 | Austria | Jan. 10, 1912 |
| 195,996 | Canada | January 1920 |